US012801336B2

(12) United States Patent
Brunet

(10) Patent No.: US 12,801,336 B2
(45) Date of Patent: Nov. 17, 2026

(54) ARTIFICIAL INTELLIGENCE-BASED AUDIO DYNAMIC RANGE COMPRESSOR

(71) Applicant: Samsung Electronics Co., Ltd., Suwon-si (KR)

(72) Inventor: Pascal M. Brunet, Pasadena, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 325 days.

(21) Appl. No.: 18/392,396

(22) Filed: Dec. 21, 2023

(65) Prior Publication Data

US 2025/0103273 A1 Mar. 27, 2025

Related U.S. Application Data

(60) Provisional application No. 63/540,245, filed on Sep. 25, 2023.

(51) Int. Cl.
*G06F 3/16* (2006.01)

(52) U.S. Cl.
CPC .................................... *G06F 3/165* (2013.01)

(58) Field of Classification Search
CPC ....................................................... G06F 3/165
See application file for complete search history.

(56) References Cited

U.S. PATENT DOCUMENTS 7,742,746 B2 6/2010 Xiang et al.
9,060,217 B2 6/2015 Thormundsson et al.
9,431,982 B1 8/2016 Yang et al.
10,402,150 B2 9/2019 Aoki et al.
10,777,050 B2 9/2020 Ap Dafydd et al.
11,316,490 B2 4/2022 Chon et al.
2018/0114536 A1* 4/2018 Cassidy ................. H04R 3/007
2020/0005802 A1* 1/2020 You ........................ H03G 7/007

FOREIGN PATENT DOCUMENTS

JP 2014175838 A * 9/2014

OTHER PUBLICATIONS

Giannoulis, D. et al., "Digital dynamic range compressor design—A tutorial and analysis." Journal of the Audio Engineering Society, Jun. 2012, p. 399-408, vol. 60, No. 6, United States.
Mimilakis, S.I. et al., "Deep Neural Networks for Dynamic Range Compression in Mastering Applications", 140th Audio Engineering Society Convention, Jun. 4, 2016, p. 107, Paris, France.
Sheng, D., et al., "A Feature Learning Siamese Model for Intelligent Control of the Dynamic Range Compressor", IJCNN 2019. International Joint Conference on Neural Networks, Jul. 14, 2019, pp. 1-8, Budapest, Hungary.

(Continued)

*Primary Examiner* — Joseph Saunders, Jr.
(74) *Attorney, Agent, or Firm* — Sherman IP LLP; Kenneth L. Sherman; Steven Laut

(57) ABSTRACT

One embodiment provides a computer-implemented method that includes predicting, based on an artificial intelligence (AI) model, a look-ahead level to adjust one or more levels for an audio stream in real-time. The method further includes providing level adjustments without user parametrization while improving sound quality for the audio stream.

20 Claims, 5 Drawing Sheets

(56) References Cited

OTHER PUBLICATIONS

Steinmetz, C et al., "Efficient neural networks for real-time modeling of analog dynamic range compression", May 2022 Conference, 152nd Audio Engineering Society Convention, Feb. 11, 2021, pp. 1-9, United States.
Grace Period Disclosure}: "Application of ML-Based Time Series Forecasting to Audio Dynamic Range Compression", Pascal Brunet, Yuan Li and Soohyun Kim, Audio Engineering Society 155th Convention, Oct. 25-27, 2023, New York, USA, Paper 129, pp. 1-8.

* cited by examiner $$L(t) = 10\,Log\left(\frac{1}{T}\int_{t-T}^{t}|u|^2 dt\right)$$

ARTIFICIAL INTELLIGENCE-BASED AUDIO DYNAMIC RANGE COMPRESSOR

CROSS-REFERENCE TO RELATED APPLICATIONS

This application claims the priority benefit of U.S. Provisional Patent Application Ser. No. 63/540,245, Sep. 25, 2023, which is incorporated herein by reference in its entirety.

STATEMENT REGARDING PRIOR DISCLOSURES BY THE INVENTOR OR A JOINT INVENTOR

The following disclosure(s) are submitted under 35 U.S.C. 102(b)(1)(A):

DISCLOSURE(S): Application of ML-Based Time Series Forecasting to Audio Dynamic Range Compression, Pascal Brunet, Yuan Li and Soohyun Kim, Audio Engineering Society 155$^{th}$ Convention, Oct. 25-27, 2023, New York, USA, Paper 129, pp 1-8.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to real-time level adjustment of audio streams, and in particular, to look-ahead AI-based level prediction for adjusting the levels on an audio stream in real-time.

BACKGROUND

Dynamic Range Compression (DRC) are used typically to raise level of quiet sounds and attenuate loud ones. Commonly used in production and broadcast of audio content. Main applications: TV and radio for limited dynamic playback and increase perceived loudness, automotive to work around high background noise, in commercials to increase the perceived loudness, in music production to shape transients and/or increase the perceived loudness.

SUMMARY

One embodiment provides a computer-implemented method that includes predicting, based on an AI model, a look-ahead level to adjust one or more levels for an audio stream in real-time. The method further includes providing level adjustments without user parametrization while improving sound quality for the audio stream.

Another embodiment includes a non-transitory processor-readable medium that includes a program that when executed by a processor adjusts levels on an audio stream in real-time, including predicting, by the processor, based on an AI model, a look-ahead level to adjust one or more levels for an audio stream in real-time; and providing level adjustments without user parametrization while improving sound quality for the audio stream.

Still another embodiment provides an apparatus that includes a memory storing instructions, and at least one processor executes the instructions including a process configured to predict, based on an AI model, a look-ahead level to adjust one or more levels for an audio stream in real-time, and to provide level adjustments without user parametrization while improving sound quality for the audio stream.

These and other features, aspects and advantages of the one or more embodiments will become understood with reference to the following description, appended claims and accompanying figures.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
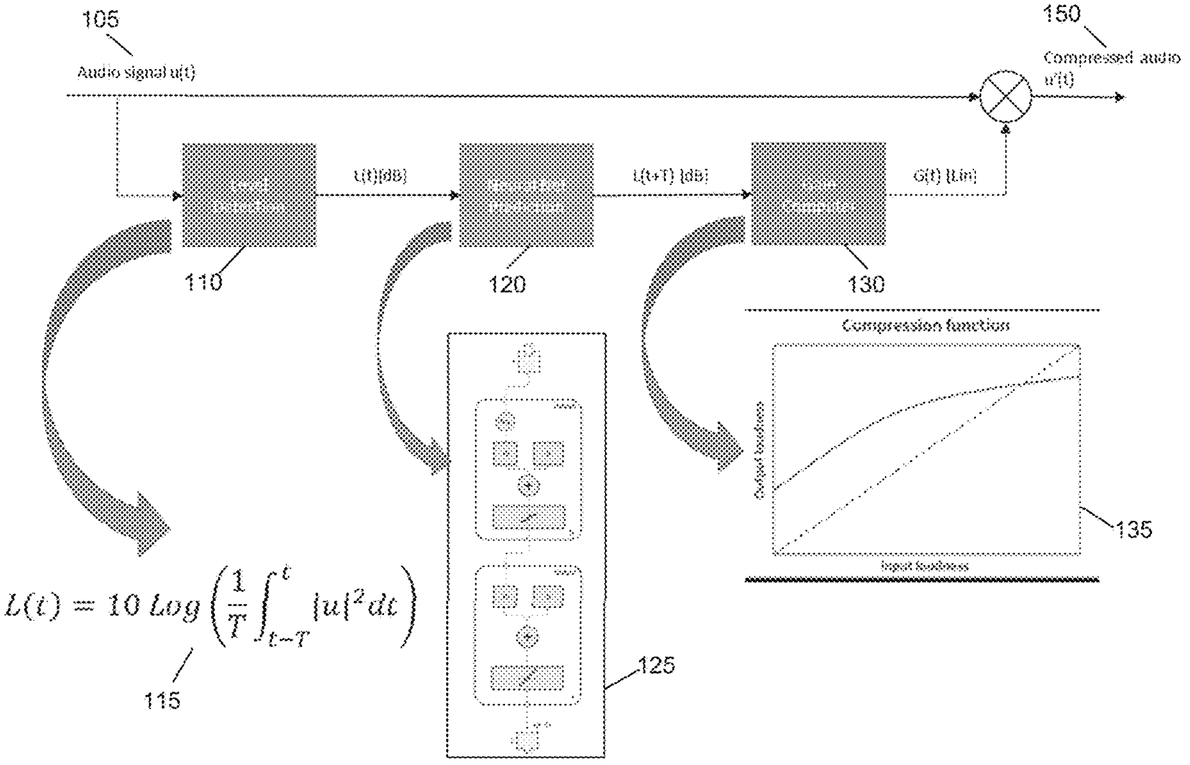
FIG. 1 illustrates a block diagram of an AI-based compressor, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

A description of example embodiments is provided on the following pages. The text and figures are provided solely as examples to aid the reader in understanding the disclosed technology. They are not intended and are not to be construed as limiting the scope of this disclosed technology in any manner. Although certain embodiments and examples have been provided, it will be apparent to those skilled in the art based on the disclosures herein that changes in the embodiments and examples shown may be made without departing from the scope of this disclosed technology.

One or more embodiments relate generally to real-time level adjustment of audio streams, and in particular, to look-ahead AI-based level prediction for adjusting the levels on an audio stream in real-time. One embodiment provides a computer-implemented method that includes predicting, based on an AI model, a look-ahead level to adjust one or more levels for an audio stream in real-time. The method further includes providing level adjustments without user parametrization while improving sound quality for the audio stream.

Common problems found in state-of-art compressors are: breathing, pumping, latency because of look-ahead delay, tuning complexity (especially for multiband compressors), intermodulation between frequency bands, distortion, tonal change, washed out, no punch sound, and stereo image shift. Specific to multiband compressors: changing timbre and tonal balance, resonances, phase shifting. Some embodiments use look-ahead level prediction to adjust the levels on an audio stream in real-time and compress/limit its dynamic range. The level prediction is based on AI techniques. The following features of one or more embodiments include at least: look-ahead level control, zero-latency, and level prediction with AI. In some embodiments, a few of the problems solved are: no latency, simple tuning: no more attack and release time constants, which are difficult to tune and impact the sound quality, and no more breathing, pumping effects due to improper setting of attack and release time constants.

Based on time series forecasting (TSF) principles, some embodiments use look-ahead level prediction to adjust the levels on an audio stream in real-time and compress its dynamic range. The level prediction uses machine learning (ML) techniques, such as Recurrent Neural Network (RNN), Long Short-term Memory (LSTM), Gated Recurrent Units (GRUs), Attention-based Transformers, etc. In one or more embodiments, some of the advantages of this approach are: no latency, simpler tuning, and better sound quality. Notably, the attack and release time constants are eliminated, which are difficult to tune and impact the sound quality; eliminating potential breathing, pumping effects.

By utilizing past information, ML models can learn the relationship between input characteristics and upcoming values. The resulting model can forecast the values at future time instances. Given a time series $x_1, x_2, \ldots x_t$, where $x_t$ is a vector of N input features observed or measured at time t, the goal is to design a model to predict $\hat{x}_{(t+1)}$ at a future time t+1. A functional relationship learned by the ML models of one-step ahead forecasting is as follows:

$$\hat{x}_{(t+1)} = f(x_{t-k}, \ldots x_t) \quad \text{(Eq. 1)}$$

where $x_{t-k}, \ldots x_t$ are the vector of observed input features from time t−k to t; f is the prediction function learned from the models; k is the depth of past time steps.

Dynamic range compression (DRC) is a signal processing technique used in audio and music production to control the difference between the loudest and quietest parts of an audio signal. DRC involves reducing the dynamic range of an audio signal by attenuating or compressing the amplitude of the signal's peaks, making the overall audio signal more balanced and consistent in volume. This technique is commonly applied to improve audio recordings' perceived loudness and clarity, ensuring that quieter sounds are still audible without distorting or clipping the louder parts. The main parameters of a DRC compressor are as follows. Threshold Setting: a threshold is a certain level below that the signal is considered quiet or insignificant. When the audio signal surpasses this threshold, dynamic range compression starts to take actions. Compression Ratio: the compression ratio determines how much the audio signal above the threshold will be reduced in amplitude. Attack Time: this parameter determines how quickly the compressor responds once the audio signal crosses the threshold. A shorter attack time means the compressor reacts swiftly to changes in volume. Release Time: release time governs how long it takes for the compressor to return to normal operation after the input signal falls below the threshold again. Knee: this defines the gradualness with which compression is applied as the signal approaches the threshold. A "soft knee" introduces compression gradually before the threshold is fully crossed, resulting in a smoother transition. Make-up Gain: after compression, the overall signal level might be reduced. Make-up gain compensates for this reduction by amplifying the compressed signal to achieve a desired output level. Delay: a delay is often inserted in the direct path in digital implementations to compensate for the attack time and other lags in the side channel. Knowing the incoming audio level allows the compressor to anticipate changes in the audio signal before they occur, helping to provide more accurate and refined compression. This helps the compressor respond more accurately to rapid changes in the audio signal. While a look-ahead level prediction allows the compressor to apply compression just in time, it avoids latency and attack/release time constants tuning, which are proper to traditional DRC and challenging to adjust appropriately.

FIG. 1 illustrates a block diagram of an AI-based compressor, according to some embodiments. In one or more embodiments, an audio signal u (t) 105 is input to a level detection process 110 and a neural net or network (NN) prediction process 120. The level detection process 110 results in the level output 115 of L(t) (dB), where $$L(t) = 10\log\left(\frac{1}{T}\int_{t-T}^{t} |u|^2 dt\right).$$

The output L(t) (dB) from the level detection process 110 is input to the NN prediction process 120. Using the time delay NN processing 125, the resulting output is L(t+T) (dB), which is input to the gain computer process 130 where a typical example of compression law is applied where input levels are limited, and low levels are raised. In some embodiments, for the gain computer process 130: L'=f(L) [in dB], where f is a function that applies compression and/or limiting of the input level (see, e.g., graph 135 for a compression function), $$G = 10^{\frac{L'-L}{20}},$$

which results in a conversion to linear gain. In one or more embodiments, time smoothing may be applied on the gains applied on each sample to avoid discontinuities between successive frames. The output from the gain computer process 130, G(t)[Lin] is added to the audio signal u(t) resulting in compressed audio u'(t) 150.

For time-series forecasting, some embodiments use single-step time-series forecasting with a memory depth M of 5, which means a NN predicts the audio level of one future time frame based on five preceding time frames, including the current time frame. With an M of 5, an input for a NN is an array of five sequential audio level values, and the output is one audio level prediction value. With one or more embodiments, testing with M from 1 to 15, the precision increased as M increased. However, in the range of 5 to 15, the improvement in Mean Absolute Error (MAE) loss was only different at the second decimal point in the dB scale, which, therefore, is not worth increasing computation. In some embodiments, the size of the hidden nodes may be set to 32 based on the input memory depth to ensure that the network is capable to represent the problem without overfitting. Each time frame is one second in length with no overlap, and the audio level value of each time frame is the root mean square (rms) level of the audio signal for the corresponding one-second window. In one or more embodiments, different time frame lengths T of 0.1, 0.2, 0.5, 1 and 2 seconds are used, and the training loss decreased as the time frame length increased, which means better prediction accuracy. However, it also means that the time series of rms levels has become more predictable with less time resolution because averaging with a longer time length evens out the detailed changes in the audio level dynamics. With less time resolution, the resolution of the dynamic range control is also lost, which is the ultimate goal of the DRC algorithm described below. In some embodiments, one second is used as a trade-off between prediction accuracy and time resolution since it preserves enough time resolution for audio level fluctuations.

DRC Algorithm with ML-Based TSF $f_s$←sampling rate [Hz]

Leq duration [in s]: T←1

Frame size [in samples]: N←[T$f_s$]

Initial net state: $L_{state}$←vector of initial Leq's

Initial gain (linear value): G←1 while not end of input audio stream do

Read frame x from input stream

Calculate current Leq:

$$L \leftarrow 10\log\left(\frac{1}{N}\sum_{n=1}^{N}|x_n|^2\right)$$

Apply gain to x: y←G x

Write frame y to output stream

Leq prediction and state update with NN:

[$L_{next}$, $L_{state}$]←Net(L, $L_{state}$)

Apply compression law: Lr←f(Lnext)

Compute next gain (linear value):

$G=10^{(Lr-Lnext)/20}$ end while where Leq is equivalent continuous sound level in dB.

Consider a compression law f(L), where L is a raw audio level, f(L) is the compressed audio level, and the compression ratio r is given as $$\frac{1}{r} = \frac{\partial f(L)}{\partial L}.$$

Due to the prediction error δ of a NN, some embodiments apply this compression law on the predicted audio level $\hat{L}$=L+δ, so the compression gain obtained from the algorithm listed above is f($\hat{L}$)−$\hat{L}$. However, this compression gain is then applied on the raw audio level L, which results in the final output audio level $\tilde{L}$ given as $$\tilde{L} = L + f(\hat{L}) - \hat{L} = f(L+\delta) - \delta \simeq f(L) + \left(\frac{\partial f}{\partial L}\right)\delta - \delta = f(L) - \left(1 - \frac{1}{r}\right)\delta, \quad \text{(Eq. 2)}$$

where the equality precisely holds when f is linear. As the dynamic range of the output audio level $\tilde{L}$ is where interest lies, which can be quantified as the variance Var($\tilde{L}$) based on Eq. (2) as follows.

$$\mathrm{Var}(\tilde{L}) = (1/r)^2\mathrm{Var}(L) + (1-1/r)^2\mathrm{Var}(\delta) - 2(1/r)(1-1/r)\mathrm{Cov}(L,\delta) \quad \text{(Eq. 3)}$$

for $$f(L) \sim \frac{L}{r}.$$

Eq. 3 indicates the prediction error δ brings an additional variance and covariance term into Var($\tilde{L}$), compared to the ground truth compression result, Var (f(L))=$(1/r)^2$Var(L), which is a performance loss in terms of dynamic range compression. The weighting coefficient of Var(δ) and Cov (L,δ) are already on par with that of Var(L) for r=2, and even get more dominant as the compression ratio r increases. Therefore, if the variance of a raw audio level is on par with the variance of a NN's prediction error, not enough compression is obtained with the algorithm listed above. For instance, a pop music piece typically has a narrow dynamic range and thus a small Var(L), which is on par with Var(δ) and Cov(L; δ). In such a case, only the actual compression ratio of 1.16 is obtained even though the compression ratio r=2 for the algorithm. In contrast, for a classical music piece with a large dynamic range, in which Var(L) is multiple times bigger than Var(δ) and Cov(L; δ), the actual compression ratio of 1.62 is obtained, which is much closer to the compression ratio r=2 that is set. This demonstrates that the algorithm listed above is more effective for the audio material which has a large dynamic range.

Figure 2:
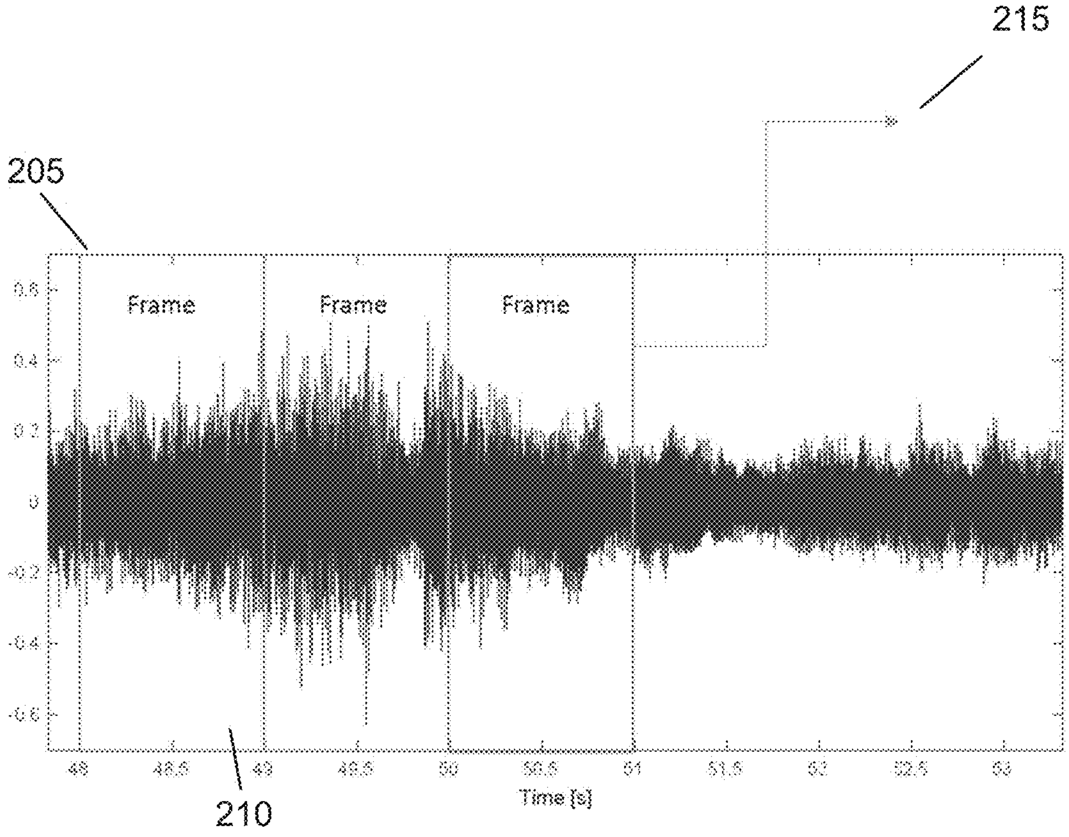
FIG. 2 illustrates a graph of multiple frames for level (output in decibels (dB)) versus time, according to some embodiments.

FIG. 2 illustrates a graph 205 of multiple frames 210 for level (output in decibels (dB)) versus time, according to some embodiments. In one or more embodiments, for each frame 210, processing 215 extracts a vector of signal samples: u=[$u_n$, $u_{n+1}$ . . . $u_{n+N-1}$] covering the frame of duration T, where Level $$L_n = 10\log\left(\frac{1}{N}\|u\|_2^2\right),$$

in dB. In some embodiments, rms level detection is performed over successive time frames of duration T, and Level $L_n$ is output in dB←$Leq_T$.

Figure 3:
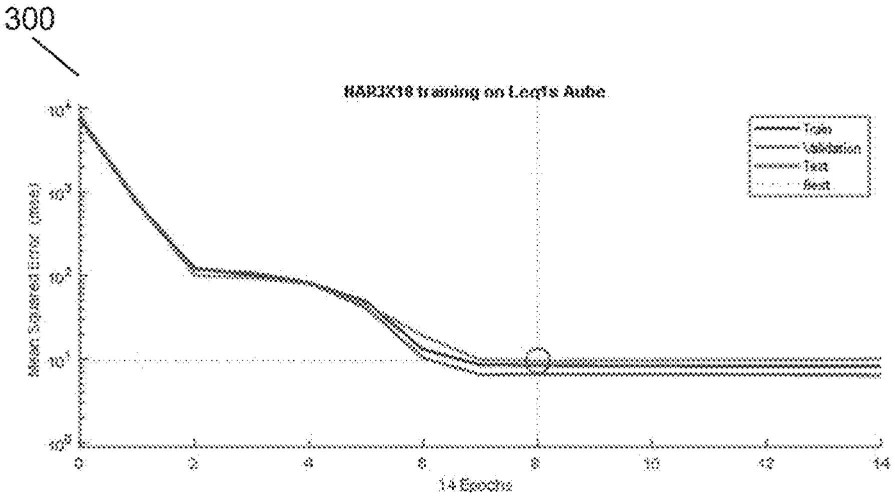
FIG. 3 illustrates a graph for a neural network training, showing mean square error (MSE) of estimation of next level ahead versus Epochs, according to some embodiments.

FIG. 3 illustrates a graph 300 for NN training, showing mean square error (MSE) of estimation of next level ahead versus Epochs, according to some embodiments. In one or more embodiments, y(t)=$Leq_T$(t) with frames duration T=1 [s] with the output of y(t+1)=$Leq_T$(t+T). For NN prediction: estimate next level ahead (at time t+T), based on the past level values, using a NN.

Figure 4:
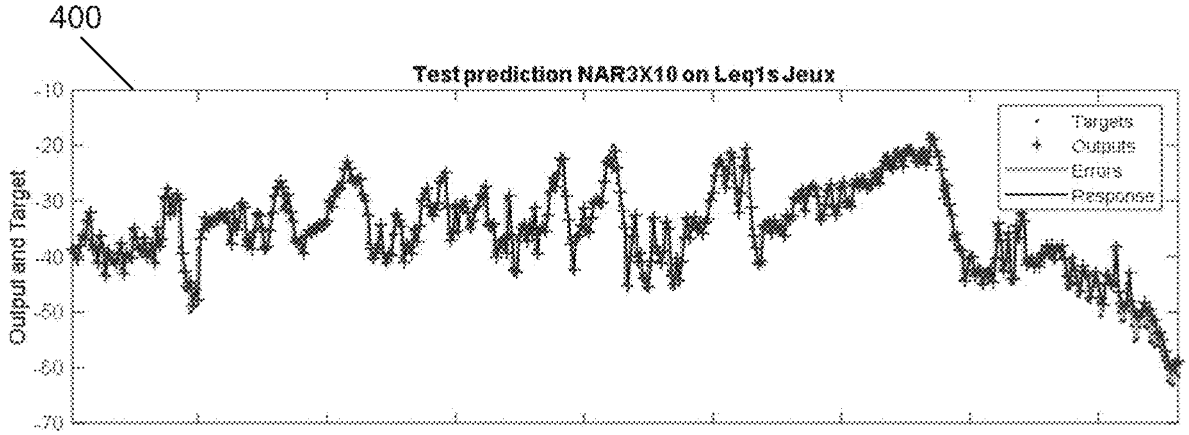
FIG. 4 illustrates a graph for test prediction, according to some embodiments.

FIG. 4 illustrates a graph 400 for test prediction, according to some embodiments. For one or more embodiments, LSTM provides the best results in term of forecasting precision with an MAE of 1.87 dB. In some embodiments, DRC based on TSF with ML techniques is a viable approach for dynamic range compression of large dynamic range material, which is the principal aim of DRC. In particular, based on blind listening tests, the sound quality of the compressed material is on par with traditional DRC. The simplicity of use, with no tuning required, provides an improvement over the conventional techniques for sound engineers, or even for end users.

Figure 5:
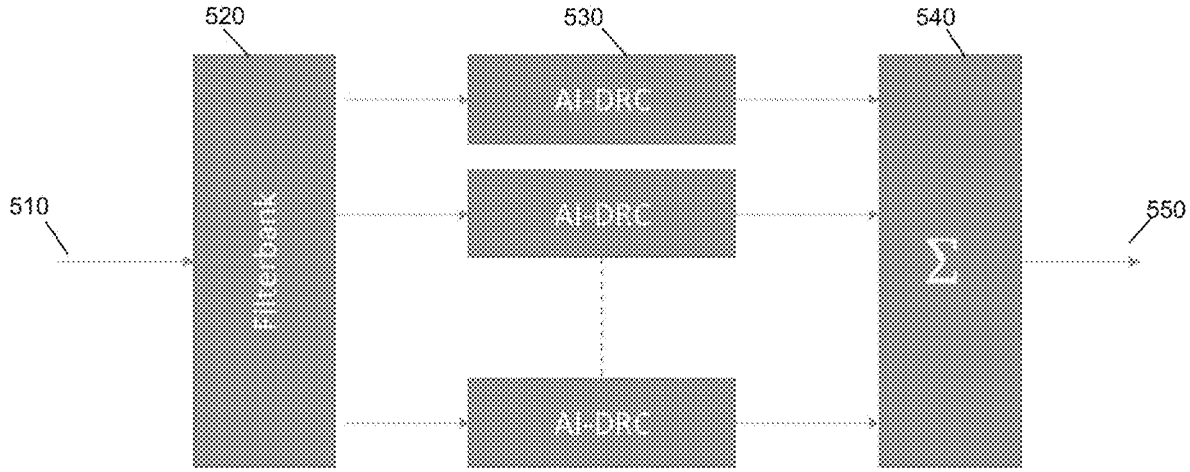
FIG. 5 illustrates a block diagram of another AI-based multi-band compressor, according to some embodiments.

FIG. 5 illustrates a block diagram of another AI-based multi-band compressor, according to some embodiments. In one or more embodiments, audio signal 510 is input to a filterbank 520. The output of the filterbank 520 is input to multiple (multi-band) AI-DRC processing blocks 530. The output from the multiple AI-DRC processing blocks 530 are input to block 540 for summation and output of the resulting audio 550.

In some embodiments, the AI-Limiter operates similarly in principle as the AI-based compressor of FIG. 1 with a short time look-ahead T (e.g., one or few samples ahead) and strict limit for the compression law L'=f(L). For example, L'=Lmax if L≥Lmax. In some embodiments, to obtain sampling time accuracy, the level detection may be performed using a Hilbert transform or a Teager Energy Operator.

Figure 6:
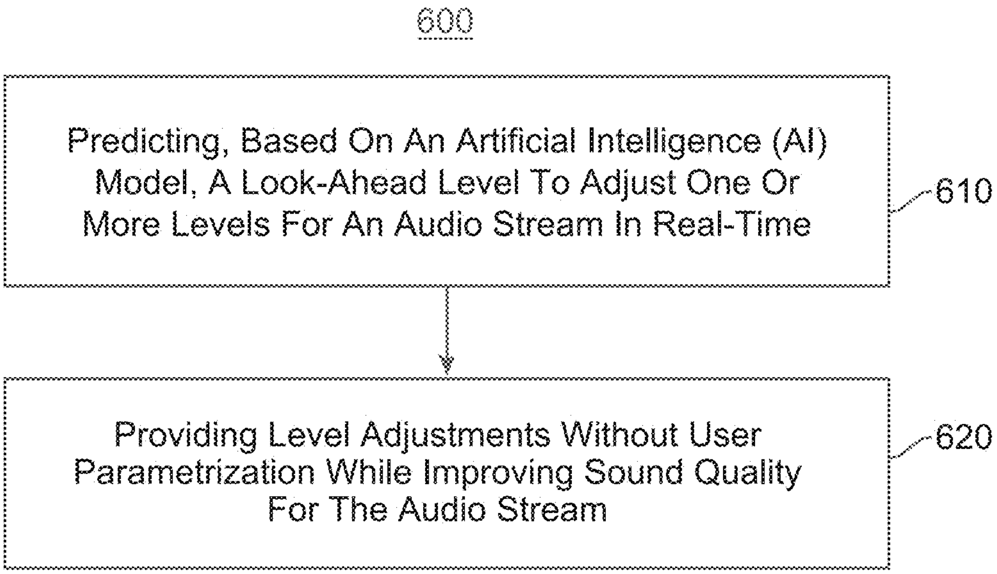
FIG. 6 illustrates a process for look-ahead AI-based level prediction for adjusting the levels on an audio stream in real-time, according to some embodiments.

FIG. 6 illustrates a process 600 for look-ahead AI-based level prediction for adjusting the levels on an audio stream in real-time, according to some embodiments. In block 610, process 600 predicts, based on an AI model, a look-ahead level to adjust one or more levels for an audio stream in real-time. In block 620, process 600 provides level adjustments without user parametrization while improving sound quality for the audio stream.

In some embodiments, process 600 includes the feature that adjusting the one or more levels for the audio stream controls a dynamic range of the audio stream, and produces zero-latency.

In one or more embodiments, process 600 further provides that at least one level of the one or more levels for the audio stream is determined based on mean energy per frame.

In one or more embodiments, process 600 additionally provides that the audio stream is limited based on its energy on a per sample basis.

In some embodiments, process 600 still further provides the feature that the dynamic range of the audio stream is controlled independently in parallel frequency bands.

In one or more embodiments, process 600 further provides that determining an optimal frame size for the audio stream is based on signal analysis applied to the audio stream.

In some embodiments, process 600 additionally provides the feature that the signal analysis includes determining a beat rate for the audio stream.

In some embodiments, DRC of audio material (music, speech, soundtrack, etc.) may be employed for: cell phones: loudness increase and micro-driver protection; TV: background noise mitigation for movie watching and dialog enhancement; automotive: background noise mitigation for music listening, etc.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A computer-implemented method comprising:
- predicting, based on an artificial intelligence (AI) model, a look-ahead level to adjust one or more levels for an audio stream in real-time and to compress its dynamic range; and
- providing level adjustments without user parametrization, wherein providing the level adjustments eliminates attack and release time constants while improving sound quality for the audio stream.

2. The method of claim 1, wherein:
- adjusting the one or more levels for the audio stream controls the dynamic range of the audio stream, and produces zero-latency.

3. The method of claim 2, wherein the dynamic range of the audio stream is controlled independently in parallel frequency bands.

4. The method of claim 1, wherein at least one level of the one or more levels for the audio stream is determined based on mean energy per frame.

5. The method of claim 1, wherein the audio stream is limited based on its energy on a per sample basis.

6. The method of claim 1, further comprising:
- determining an optimal frame size for the audio stream based on signal analysis applied to the audio stream.

7. The method of claim 6, wherein the signal analysis includes determining a beat rate for the audio stream.

8. A non-transitory processor-readable medium that includes a program that when executed by a processor adjusts levels on an audio stream in real-time, comprising:
- predicting, by the processor, based on an artificial intelligence (AI) model, a look-ahead level to adjust one or more levels for an audio stream in real-time and to compress its dynamic range; and
- providing level adjustments without user parametrization, wherein providing the level adjustments eliminates attack and release time constants while improving sound quality for the audio stream.

9. The non-transitory processor-readable medium of claim 8, wherein:

adjusting the one or more levels for the audio stream controls the dynamic range of the audio stream, and produces zero-latency.

10. The non-transitory processor-readable medium of claim 9, wherein the dynamic range of the audio stream is controlled independently in parallel frequency bands.

11. The non-transitory processor-readable medium of claim 8, wherein at least one level of the one or more levels for the audio stream is determined based on mean energy per frame.

12. The non-transitory processor-readable medium of claim 8, wherein the audio stream is limited based on its energy on a per sample basis.

13. The non-transitory processor-readable medium of claim 8, further comprising:

determining an optimal frame size for the audio stream based on signal analysis applied to the audio stream.

14. The non-transitory processor-readable medium of claim 13, wherein the signal analysis includes determining a beat rate for the audio stream.

15. An apparatus comprising:

a memory storing instructions; and at least one processor executes the instructions including a process configured to:

predict, based on an artificial intelligence (AI) model, a look-ahead level to adjust one or more levels for an audio stream in real-time and to compress its dynamic range; and provide level adjustments without user parametrization, wherein providing the level adjustments eliminates attack and release time constants while improving sound quality for the audio stream.

16. The apparatus of claim 15, wherein:

adjusting the one or more levels for the audio stream controls a dynamic range of the audio stream, and produces zero-latency.

17. The apparatus of claim 16, wherein the dynamic range of the audio stream is controlled independently in parallel frequency bands.

18. The apparatus of claim 15, wherein at least one level of the one or more levels for the audio stream is determined based on mean energy per frame.

19. The apparatus of claim 15, wherein the audio stream is limited based on its energy on a per sample basis.

20. The apparatus of claim 15, further comprising:

determining an optimal frame size for the audio stream based on signal analysis applied to the audio stream;

wherein the signal analysis includes determining a beat rate for the audio stream.

* * * * *